United States Patent
Liikanen

(10) Patent No.: US 11,579,961 B2
(45) Date of Patent: Feb. 14, 2023

(54) BIT ERROR RATE BASED DYNAMIC PROGRAM STEP CHARACTERISTIC ADJUSTMENT

(71) Applicant: Micron Technology, Inc., Boise, ID (US)

(72) Inventor: Bruce A. Liikanen, Berthoud, CO (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 17/220,126

(22) Filed: Apr. 1, 2021

(65) Prior Publication Data
US 2021/0216395 A1   Jul. 15, 2021

Related U.S. Application Data

(63) Continuation of application No. 16/214,420, filed on Dec. 10, 2018, now Pat. No. 10,970,160.

(51) Int. Cl.
*G06F 11/07* (2006.01)
(52) U.S. Cl.
CPC ........ *G06F 11/0793* (2013.01); *G06F 11/073* (2013.01); *G06F 11/076* (2013.01)
(58) Field of Classification Search
CPC .... G06F 11/076; G06F 11/048; G06F 11/073; G06F 11/0793
See application file for complete search history.

(56) References Cited

U.S. PATENT DOCUMENTS

| | | | |
|---|---|---|---|
| 8,862,969 B2 | 10/2014 | Liikanen et al. | |
| 9,122,626 B2 | 9/2015 | Kim | |
| 9,135,109 B2 | 9/2015 | Ghaly | |
| 9,514,837 B2 | 12/2016 | Shapira | |
| 9,589,661 B2 | 3/2017 | Kim | |
| 9,607,701 B2 * | 3/2017 | Wilson | G11C 16/26 |
| 2014/0258796 A1 * | 9/2014 | Ghaly | G06F 11/1008 714/708 |
| 2014/0334228 A1 | 11/2014 | Kim | |
| 2015/0270852 A1 | 9/2015 | Kim | |
| 2018/0341552 A1 | 11/2018 | Liikanen et al. | |

OTHER PUBLICATIONS

U.S. Appl. No. 15/981,835, entitled "Memory System Quality Margin Analysis and Configuration", filed May 16, 2018, Client Reference No. 2018-0169.00/US, (40 pgs.).
U.S. Appl. No. 16/182,399, entitled "Memory Element Profiling and Operational Adjustments", filed Nov. 6, 2018, Client Reference No. 2018-0057.00/US, (34 pgs.).
U.S. Appl. No. 16/121,565, entitled "Memory Characterization and Sub-System Modification", filed Sep. 4, 2018, Client Reference No. 2017-1179.00/US, (41 pgs.).

* cited by examiner

*Primary Examiner* — Nadeem Iqbal
(74) *Attorney, Agent, or Firm* — Brooks, Cameron & Huebsch, PLLC

(57) ABSTRACT

A BER corresponding to a group of memory cells programmed via a programing signal having one or more program step characteristics is determined. The determined BER and a target BER is compared. In response to the determined BER being different than the target BER, one or more program step characteristics are adjusted to adjust the determined BER to the target BER.

20 Claims, 10 Drawing Sheets

BIT ERROR RATE BASED DYNAMIC PROGRAM STEP CHARACTERISTIC ADJUSTMENT

PRIORITY INFORMATION

This application is a Continuation of U.S. application Ser. No. 16/214,420, filed Dec. 10, 2018, the contents of which are incorporated herein by reference.

TECHNICAL FIELD

Embodiments of the disclosure relate generally to memory sub-systems, and more specifically, relate to bit error rate based dynamic program step characteristic adjustment.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
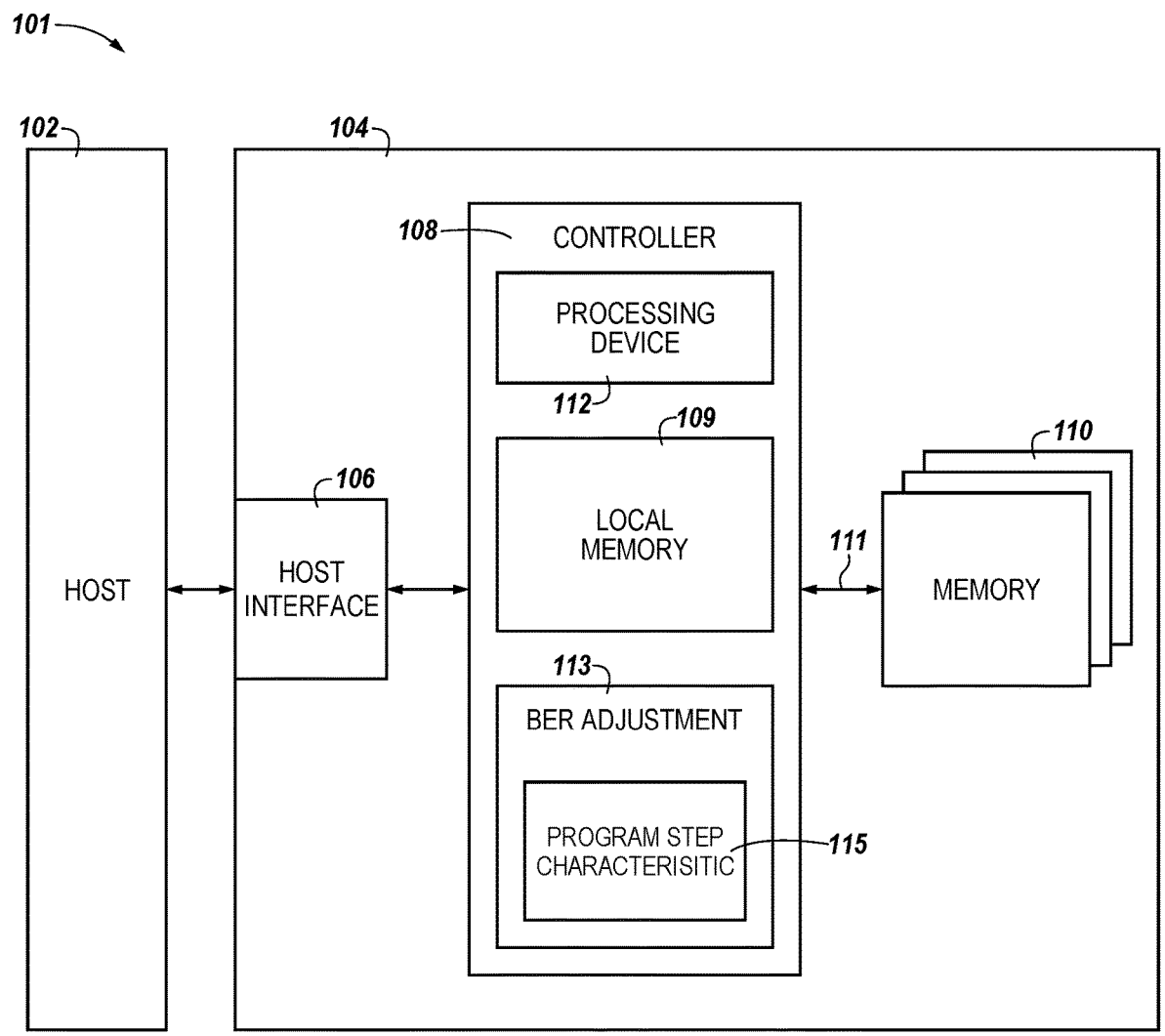
FIG. 1 illustrates an example computing environment that includes a memory sub-system in accordance with some embodiments of the present disclosure.

Aspects of the present disclosure are directed to managing BER within a memory sub-system. A memory sub-system is also hereinafter referred to as a "memory device." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

In various memory sub-systems, programming cells can involve providing a programming signal to a group of cells (e.g., a page) to place them in target states, which correspond to respective stored data patterns. For example, the cells can be non-volatile flash memory cells configured to store one or more bits of data per cell. As an example, a programming signal used to program the cells can comprise a stepped voltage signal (e.g., voltage ramp) with each step having an associated step size and duration. The programming signal can be applied (e.g., to a word line) as a series of voltage pulses, for instance. The voltage pulses have various characteristics which can affect a BER associated with the programmed cells. Such characteristics include pulse magnitude, step size between pulses, and pulse duration, among various other characteristics.

As described further herein, a BER refers to a bit error rate computed as a number of bit errors (or number of bit flips performed by an error correction code (ECC) decoder) divided by a total number of bits in a codeword. In one embodiment, the BER can be calculated based on an average BER from a number of pages in order to minimize noise of the determined BER. The sampling of BERs may include, but are not limited to, a random block and page sampling, a selected full block sampling of all pages, etc. The BER can refer to a cumulative value of BERs for a group of programmed memory cells (e.g., one or more pages of cells). The memory cells can be multilevel memory cell (MLCs) each programmable to multiple voltage levels (e.g., 4 levels, 8 levels, 16 levels, etc.) such that the cells can store multiple bits of data per cell (e.g., 2 bits, 3 bits, 4 bits, etc.). The BER corresponding to a group of memory cells is affected by various factors such as temperature, wear cycling (e.g., program/erase cycles), etc. Fluctuations in temperature can affect the BER and one or more program step characteristics can be adjusted due to temperature changes to maintain a consistent BER and maintain consistent quality and read performance. Likewise, a quantity of program/erase cycles can affect BER. As a NAND is worn through repeated program and erase cycles, the BER can increase. By adjusting one or more program step characteristics in response to BER changes due to endurance cycling, a consistent quality and read performance can be maintained.

Therefore, the BER(s) of a system can vary over time, which can affect system quality of service (QoS), reliability, and/or performance. In various instances, it can be beneficial to maintain a specified BER in order to maintain a particular system characteristic (e.g., QoS, error rate, etc.) across various environmental conditions and/or user workloads. However, it can also be beneficial to provide the ability to dynamically adjust a BER (e.g., to a target BER value) in order to change one or more system characteristics. For instance, it may be beneficial to provide one system, or components thereof, with a relatively high BER associated with low reliability (e.g., high bit error rate) and another system, or components thereof, with a relatively low BER associated with higher speed. It can also be beneficial to adjust the BER of a particular system or component thereof such that the system operates at different reliability levels and speed at different times.

Conventional memory sub-systems do not dynamically adjust BERs and/or are not be capable of adjusting the BERs in a predictable and/or controllable manner. Therefore, various conventional systems are not able to, for example, maintain a target BER with changing temperature and/or program/erase cycling.

In contrast, embodiments of the present disclosure address the above and other deficiencies by providing a memory sub-system capable of finely controlling (e.g., tuning) a BER in a more efficient manner as compared to previous approaches. For example, embodiments are capable of to achieving and maintaining a target BER by modifying one or more characteristics of voltage signals (e.g., pulses) used to program memory cells. Such a memory sub-system can provide various benefits such as those described above. For instance, embodiments can control a BER to maintain a particular level of quality, reliability, and/or performance of the system in various environmental conditions and/or user workloads.

FIG. 1 illustrates an example computing environment 101 that includes a memory sub-system 104 in accordance with some embodiments of the present disclosure. The memory sub-system 104 can include media, such as memory components 110. The memory components 110 can be volatile memory components, non-volatile memory components, or a combination of such. In some embodiments, the memory sub-system is a storage system. An example of a storage system is a SSD. In some embodiments, the memory sub-system 104 is a hybrid memory/storage sub-system. In general, the computing environment 100 can include a host system 102 that uses the memory sub-system 104. For example, the host system 102 can write data to the memory sub-system 104 and read data from the memory sub-system 104.

Host 102 can be a host system such as a personal laptop computer, a desktop computer, a digital camera, a mobile telephone, or a memory card reader, among various other types of hosts. Host 102 can include a system motherboard and/or backplane and can include a number of processors. Host 102 can also be a processing resource, such as where memory sub-system 104 is a memory device having an on-die controller (e.g., 108).

The host system 102 can be coupled to the memory sub-system 104 via a physical host interface 106. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory 104. The host system 102 can further utilize an NVM Express (NVMe) interface to access the memory components 110 when the memory sub-system 104 is coupled with the host system 102 by a PCIe interface. The physical host interface can provide an interface for passing control, address, data, and other signals between the memory sub-system 104 and the host system 102. The memory components 110 can include a number of arrays of memory cells (e.g., non-volatile memory cells). The arrays can be flash arrays with a NAND architecture, for example. However, embodiments are not limited to a particular type of memory array or array architecture. Although floating-gate type flash memory cells in a NAND architecture are generally referred to herein, embodiments are not so limited. The memory cells can be grouped, for instance, into a number of blocks including a number of physical pages. A number of blocks can be included in a plane of memory cells and an array can include a number of planes. As one example, a memory device can be configured to store 8 KB (kilobytes) of user data per page, 128 pages of user data per block, 2048 blocks per plane, and 16 planes per device. The memory components 110 can also include additionally circuitry (not illustrated), such as control circuitry, buffers, address circuitry, etc.

In operation, data can be written to and/or read from memory (e.g., memory components 110 of system 104) as a page of data, for example. As such, a page of data can be referred to as a data transfer size of the memory system. Data can be sent to/from a host (e.g., host 102) in data segments referred to as sectors (e.g., host sectors). As such, a sector of data can be referred to as a data transfer size of the host.

The memory components 110 can include any combination of the different types of non-volatile memory components and/or volatile memory components. An example of non-volatile memory components includes a negative-and (NAND) type flash memory. The memory components 110 can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 102. Although non-volatile memory components such as NAND type flash memory are described, the memory components 110 can be based on various other types of memory such as a volatile memory. In some embodiments, the memory components 110 can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 110 can be grouped as memory pages or data blocks that can refer to a unit of the memory component used to store data.

As illustrated in FIG. 1, the memory sub-system 104 can include a controller 108 coupled to the host interface 106 and to the memory components 110 via a memory interface 111. The controller 108 can be used to send data between the memory sub-system 104 and the host 102. The memory interface 111 can be one of various interface types compliant with a particular standard such as Open NAND Flash interface (ONFi).

The controller 108 can communicate with the memory components 110 to perform operations such as reading data, writing data, or erasing data at the memory components 110 and other such operations. The controller 108 can include hardware such as one or more integrated circuits and/or discrete components, a buffer memory, or a combination thereof. The controller 108 can be a microcontroller, special purpose logic circuitry (e.g., a field programmable gate array (FPGA), an application specific integrated circuit (ASIC), etc.), or other suitable processor. The controller 108 can include a processor (e.g., processing device 112) configured to execute instructions stored in local memory 109. In the illustrated example, the local memory 109 of the controller 108 includes an embedded memory configured to store instructions for performing various processes, operations, logic flows, and routines that control operation of the memory sub-system 104, including handling communications between the memory sub-system 104 and the host system 102. In some embodiments, the local memory 109 can include memory registers storing memory pointers, fetched data, etc. The local memory 109 can also include read-only memory (ROM) for storing micro-code. While the example memory sub-system 104 in FIG. 1 has been illustrated as including the controller 108, in another embodiment of the present disclosure, a memory sub-system 104 can not include a controller 108, and can instead rely upon external control (e.g., provided by an external host, such as by a processing device separate from the memory sub-system 104).

The controller 108 can use and/or store various operating parameters associated with operating (e.g., programming and/or reading) the memory cells. Such operating parameters may be referred to as trim values and can include programming pulse magnitude, step size, pulse duration, program verify voltages, read voltages, etc. for various different operating processes. The different processes can include processes to program cells to store different quantities of bits, and different multiple pass programming process types (e.g., 2-pass, 3-pass, etc.). The controller 108 can be responsible for other operations such as wear leveling operations, garbage collection operations, error detection and/or correction (e.g., error-correcting code (ECC)) operations, encryption operations, caching operations, and address translations between a logical block address and a physical block address that are associated with the memory components 110.

The memory sub-system 104 can also include additional circuitry or components that are not illustrated. For instance, the memory components 110 can include control circuitry, address circuitry (e.g., row and column decode circuitry), and/or input/output (I/O) circuitry by which they can communicate with controller 108 and/or host 102. As an example, in some embodiments, the address circuitry can receive an address from the controller 108 and decode the address to access the memory components 110.

In various embodiments, the controller 108 can include a BER adjustment component 113 that controls and/or communicates with a program step characteristic component 115 to determine and/or control one or more program step characteristics used to program cells. The program step characteristics can include, for example, various characteristics of voltage pulses used to program memory cells of the memory components 110. The characteristic can be, for example, a voltage difference between (e.g., two consecutive) voltage pulses used to program memory cells. In another example, the characteristic can be a duration for which voltage pulse(s) are applied to program memory cells. As used herein, the voltage difference between voltage pulses can be referred to as a program step size, and the duration for which voltage pulse(s) are applied can be referred to as a program step duration.

The memory components 110 can include memory cells for the write or program operation, such as for incremental step pulse programming (ISPP). The memory cells can be programmed (via controller) via an ISPP process in which a series of pulses of increasing magnitude are applied to the cells (to their gates) to increase the stored charge by a particular amount until the target stored charge (Vt) is reached.

Figure 2:
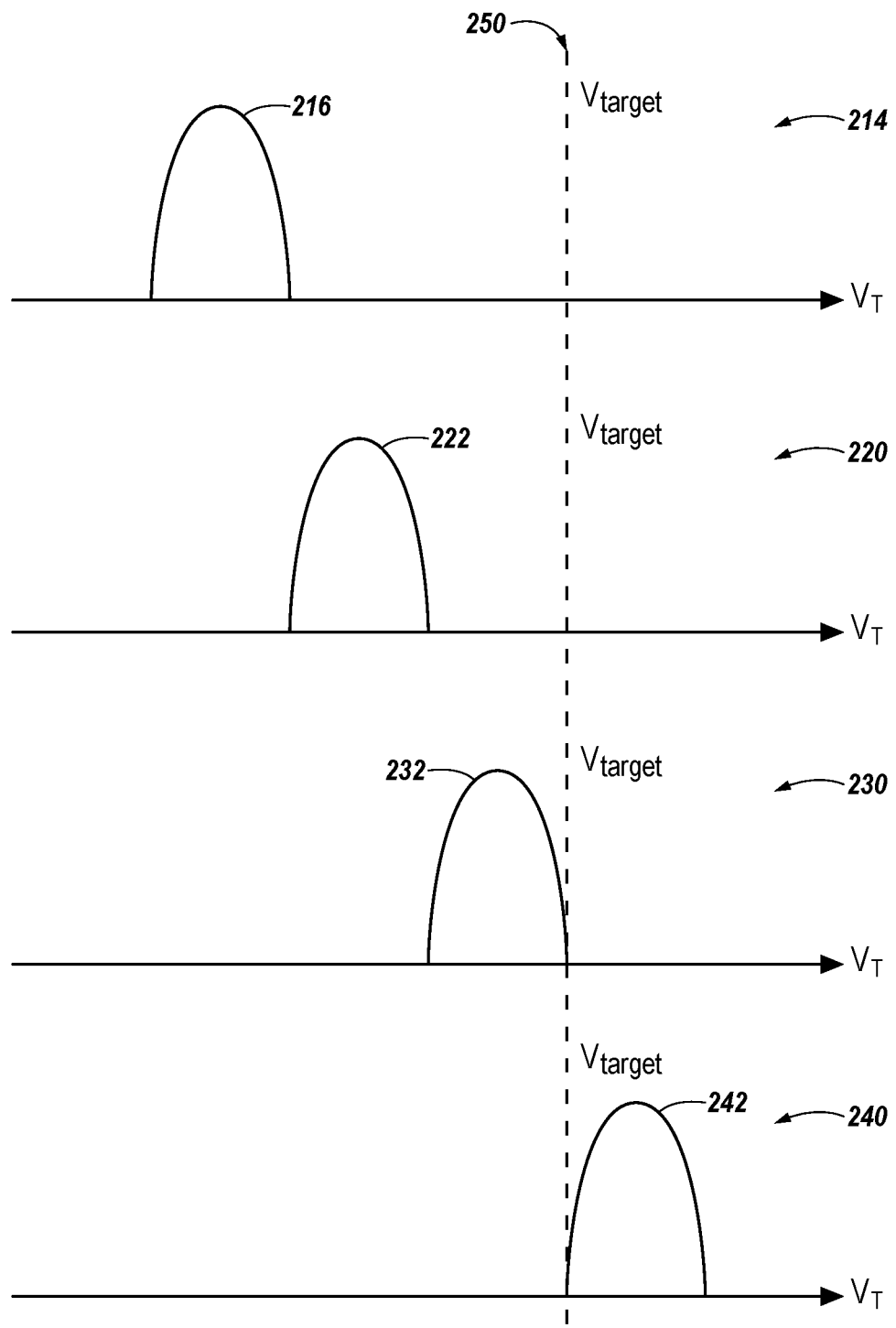
FIG. 2 illustrates an example of programming memory cells in accordance with some embodiments of the present disclosure.

For example, FIG. 2 illustrates threshold voltage (Vt) distributions of cells, which correspond to the charge stored on the charge storage structures of the memory cells, at various stages of one such incremental programming operation. Time 214 can represent a time at which the programming operation begins. Accordingly, as shown by Vt distribution 216 at time 214, the Vt of all the cells is below the target Vt level (Vtarget) 229. To program the memory cells to the desired target Vtarget 229, a series of programming steps (e.g., voltage pulses) can be used at each of a number of subsequent times 218, 222 and 226 to increase the cell Vt levels as shown by distributions 220, 224 and 228, respectively. After each programming step, a program verify operation can be performed to verify whether the cells being programmed have reached Vtarget 229. As shown in FIG. 2, programming of the cells is completed at time 226, as the Vt levels of all the cells have been increased to at or above the desired target Vt level 229, the programming operation is completed.

The amount by which the Vt distributions 216, 220, 224, and 228 increase responsive to an applied programming pulse can depend on various factors such as the magnitude of the pulse and the duration for which the pulse is applied to the cells. Accordingly, the time to program a group of cells to desired states can vary depending upon the programming signal characteristics as well as the quantity of pulses. Additionally, as described further below, multiple programming passes can be used to program multiple logical page data to cells. For example, a first pass, which can be referred to as a lower page programming process, can be used to program one or more lower pages of data to a group of cells, and one or more subsequent programming passes can be used to program additional pages of data to the group of cells.

Figure 3:
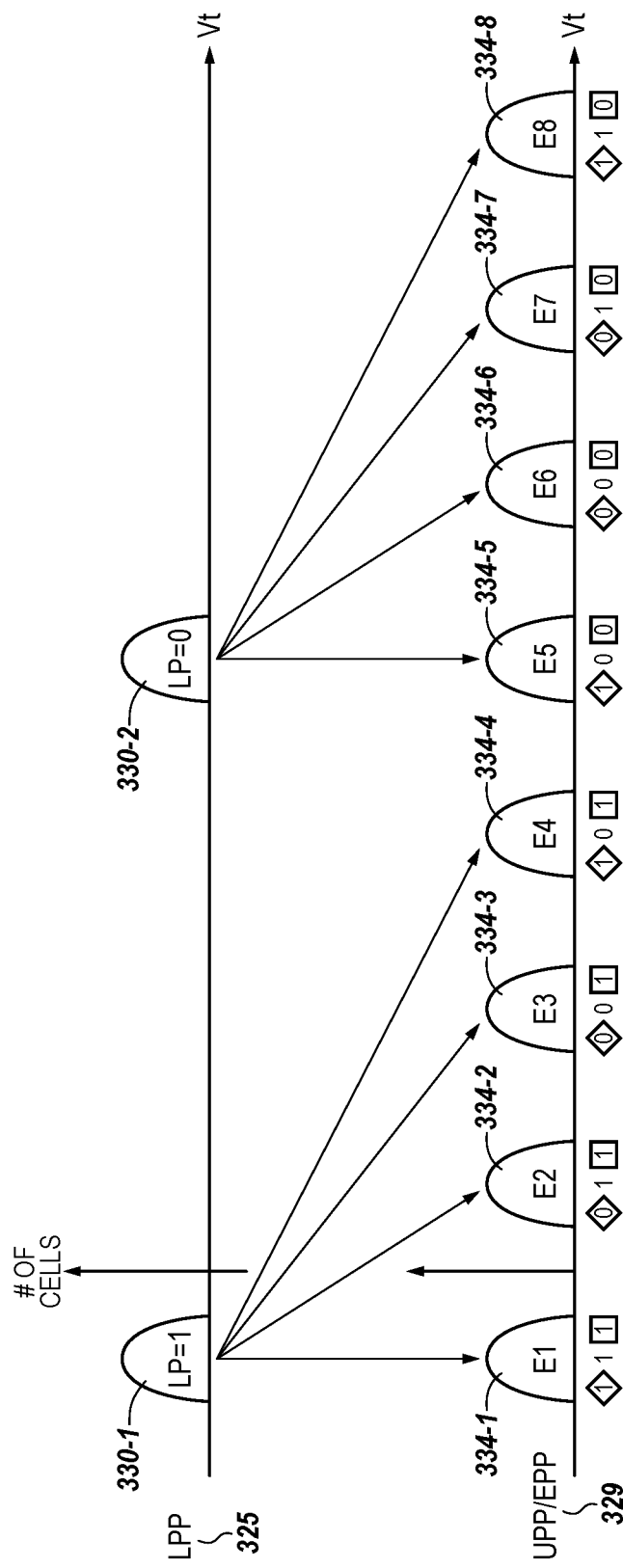
FIG. 3 illustrates threshold voltage distributions associated with a programming process in accordance with some embodiments of the present disclosure.

The diagram shown in FIG. 3 illustrates threshold voltage (Vt) distributions associated with a programming process in accordance with embodiments of the present disclosure. In this example, the process is a two-pass programming process in which a lower page (e.g., lease significant bit) of a group of memory cells is programmed in a first programming pass and an upper page (e.g., middle bit) and extra page (e.g., most significant bit) of the group are programmed in a second programming pass. The first programming pass can be referred to as a lower page programming (LPP) process 325, and the second programming pass can be referred to as an upper page programming and extra page programming process (UPP/EPP) 329.

As described further below, each of the LPP process 325 and UPP/EPP process 329 can involve application of a series of programming pulses to a selected word line corresponding to the group of cells being programmed. As part of the LPP process 325, the Vt of the memory cells are adjusted (e.g., from an erased Vt level) to one of two levels represented by Vt distributions 330-1 and 330-2. The voltage levels are represented by Vt distributions, which can reflect a statistical average Vt level of cells programmed to a particular level. In this example, cells whose lower page is to store a bit value of "1" (e.g., LP=1) are programmed to distribution 330-1 during LPP process 325, and cells whose lower page is to store a bit value of "0" (e.g., LP=0) are programmed to distribution 330-2 during LPP process 325. A lower page is a lower order page and is programmed in the array of memory cells before higher order pages are programmed.

As part of the UPP/EPP process 329, the Vt of the memory cells are adjusted to one of eight levels represented by Vt distributions 334-1 to 334-8, which correspond to data states E1 to E8, respectively, with each one of the data states E1 to E8 representing a different 3-bit stored data pattern. In this example, cells programmed to data state E1 store data "111," cells programmed to data state E2 store data "011," cells programmed to data state E3 store data "001," cells programmed to data state E4 store data "101," cells programmed to data state E5 store data "100," cells programmed to data state E6 store data "000," cells programmed to data state E7 store data "010," and cells programmed to data state E8 store data "110." While the example illustration includes a 2-pass programming, this is but one example. Additional quantities of program passes can be used. The group of cells being programmed can be, for example one or more pages of cells of the memory components 110. The group of cells can also be one or more blocks of memory cells, such as blocks of cells erased together in a particular erase operation. The one or more pages and/or the one or more blocks can be from a particular memory component (e.g., die) or from multiple dies. The group of memory cells for which a bit error rate is determined can be randomly selected or can be all of the pages of a memory component (e.g., 110) or system (e.g., 104), for instance; however, embodiments are not so limited. As described further herein, in a number of embodiments, a determined bit error rate can be adjusted (e.g., increased or decreased) by adjusting one or more programming pulse characteristics to achieve a target bit error rate for the group of memory cells. For example, the determined bit error rate can be compared to the target bit error rate, and at least one of a program step size and a program step duration can be adjusted in order to move the measured bit error rate toward the target bit error rate. Further details of measuring and adjusting the bit error rate is described below in connection with FIG. 4-9.

Figure 4A:
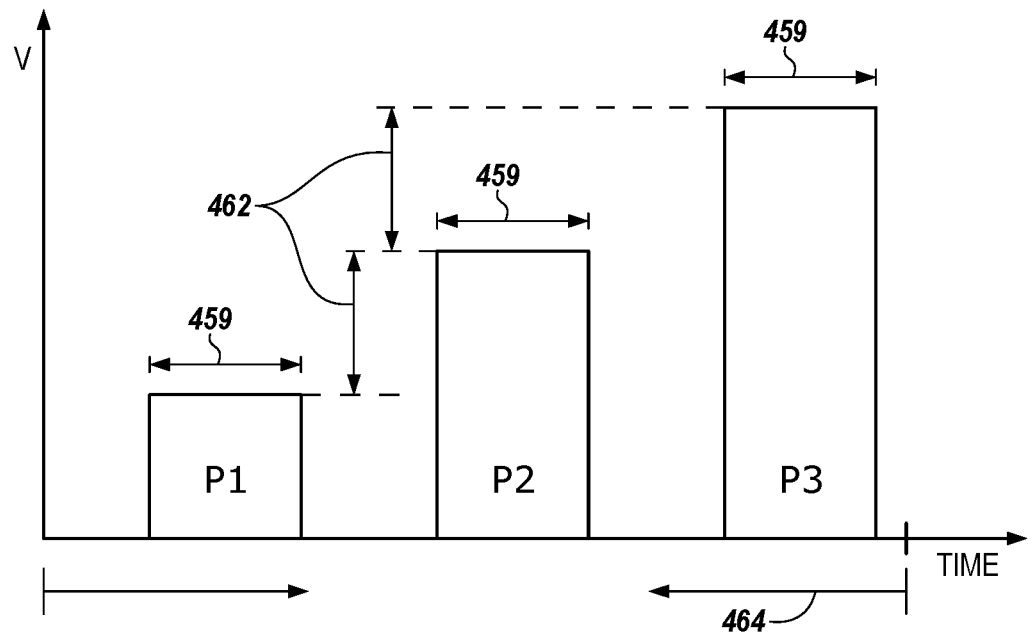
FIG. 4A-4B illustrate example programming steps whose characteristics can be adjusted in association with adjusting a bit error rate in accordance with some embodiments of the present disclosure.
Figure 4B:
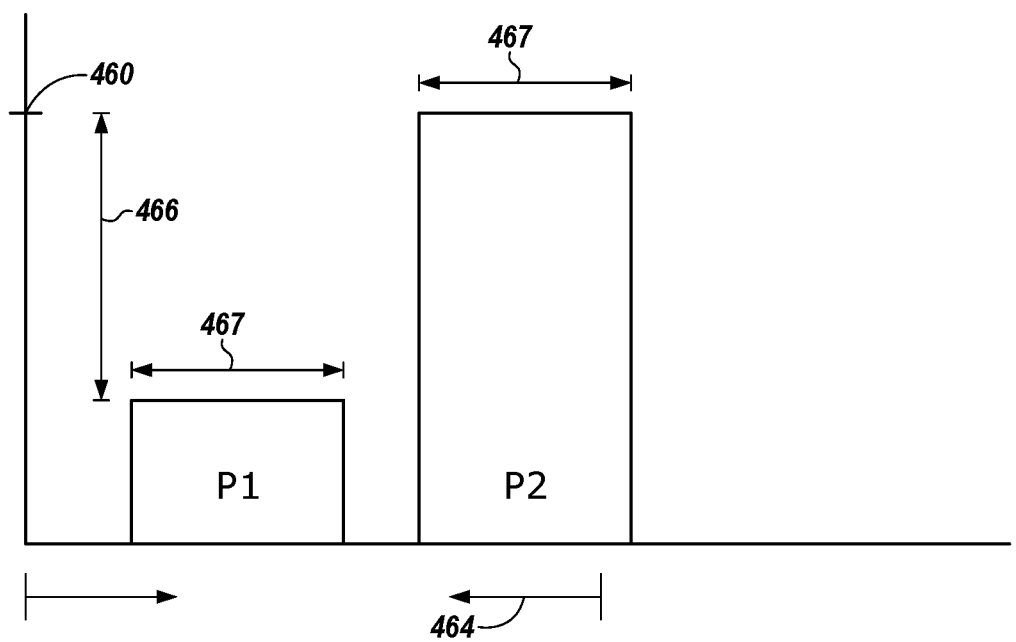

FIG. 4A-B each illustrate example programming signals in accordance with embodiments of the present disclosure. The example illustrations represent programming pulses applied to memory cells (e.g., to their gates) to increase the cell threshold voltages (Vts) to target levels. FIG. 4A illustrates a number of pulses P1, P2, and P3 associated with a programming operation having a particular PET 464. As shown in FIG. 4A, each pulse has a pulse duration 459, which may be referred to as a program step duration, and a program step size 462 between consecutive pulses.

The PET 464 can be associated with a series of pulses (e.g., P1, P2, P3) applied to a group of cells to place the cells of the group in respective target states. For example, the PET 464 can correspond for the amount of time to program each of a group of cells to one of the states E1 to E8 shown in FIG. 3. Memory systems in accordance with embodiments described herein can dynamically adjust (e.g., increase or decrease) the programming step size 462 and/or step duration 459 in order to achieve a desired bit error rate (e.g., maintain a desired bit error rate). As an example, the memory cells can be programmed using a particular program step size and program step duration and the memory cells in operation can be associated with a particular bit error rate (BER). This BER can be adjusted by reprogramming the memory cells using at least one different program step size and/or program step duration. In at least one example, this dynamic increase or decrease can be performed by the program step characteristic component 115 to dynamically adjust or calibrate the programming step size 462 and/or duration 459.

FIG. 4B illustrates the programming operation shown in FIG. 4A after implementing a programming step adjustment. For comparison, the previous program step size and program step durations, such as 462 and 459, respectively, in FIG. 4A, are illustrated. The adjusted program step size 466 is a calibrated or changed instance of the program step size 462 for replacing the program step size 462. The adjusted program step size 466 is illustrated as being greater than the program step size 462, however, adjustments can be an increase or a decrease in the program step size. Likewise, the adjusted program step duration 467 is a calibrated or changed instance of the program step duration 459 for replacing the program step duration 459. The adjusted program step duration 467 is illustrated as being greater than the program step duration 459, however, adjustments can be an increase or a decrease in the program step duration depending on a desired change in the BER. In the example shown in FIGS. 5A and 5B, the adjustments to the program step size 466 and the program step duration 467 result in a reduction in the PET 464; however, embodiments are not so limited. In at least one example, one or more program step characteristics can be increased or decreased by a respective particular amount in response to determining that the determined BER satisfies a threshold associated with the target BER (such as the determined BER is above or below a threshold target BER).

As described further below, a relationship may exist between the adjustment of a program step size and the adjustment of the program step duration. For instance, the adjustment of the program step size can be in a particular proportion to the adjustment of the program step duration based on a relationship between the program step size and the program step duration. As a result, BER can be adjusted by a particular amount in response to adjusting the program step size and/or duration by particular amounts based on the determined proportional relationship between step size and step duration and therefore respective effects on BER.

In various embodiments, the BER can be used as a feedback measure within the system, with the adjustment of one or more program step characteristics being used to adjust the BER toward a target BER responsive to a determination that the measured BER is above or below the target BER. As an example, as a BER goes above a threshold BER, a program step size and/or a program step duration can be adjusted to decrease the BER corresponding to a group of cells. Vice versa, as a BER goes below a threshold BER, a program step size and/or a program step duration can be adjusted to increase the BER. Dynamically adjusting or calibrating the programming step size 462 and/or duration 459 to affect the BER is described further in association with FIGS. 5-8 below.

Figure 4C:
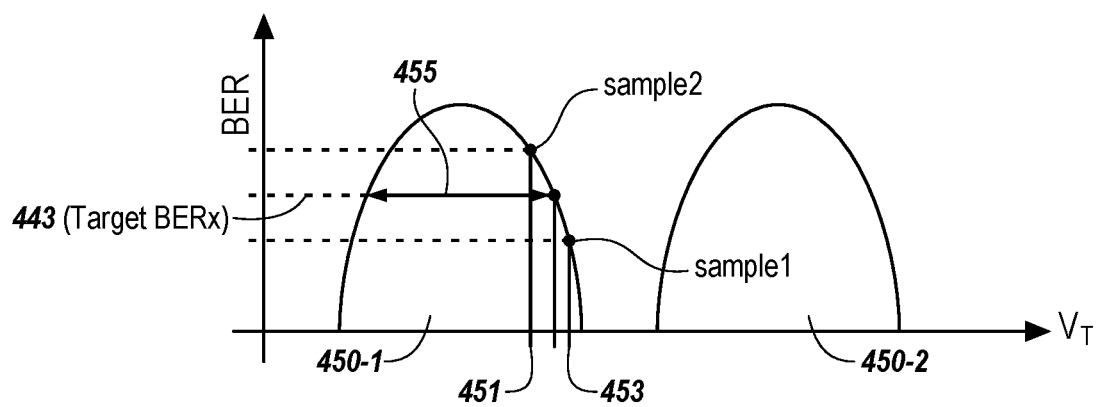
FIG. 4C illustrates a level width between threshold voltage distributions corresponding to memory cells programmed in accordance with some embodiments of the present disclosure.

FIG. 4C illustrates a level width 455 of threshold voltage (Vt) distributions 450-1 of a memory cell programmed in accordance with some embodiments of the present disclosure. The example Vt distributions 450-1 and 450-2 (collectively referred to as Vt distributions 450) can be analogous to the Vt distributions shown in FIG. 3 (e.g., Vt distributions 334-1 to 334-8) and can correspond to a particular page of memory cells.

As illustrated in FIG. 4C, the level width 455 can be a distance between adjacent edges of the Vt distributions 450-1 450-2. The level width between Vt distributions can be calculated, for example, by determining a location of the Vt distribution edges (e.g., on x-axis) by performing multiple read operations on a page of programmed cells using different read voltages and monitoring the bit error rate to determine the read voltage at which a minimum BER occurs for the page. In a number of embodiments, and as described in FIG. 4C, a level width (e.g., 455) can be determined based on a particular (e.g., target) BER for a page of cells. The target BER for purposes of level width determination can be user selected and can be 1 E-3 or 1 E-4, for instance. As an example, determining the level width 455 can include reading the page of cells using a first read voltage 453 (shown as "sample 1"). The first read voltage 453 can be a trim value used to distinguish between cells programmed to state 450-1 and state 450-2. In this example, the read using read voltage 453 results in a BER below the target BER. A subsequent read of the page of cells using a different (e.g., lower) read voltage 451 (shown as "sample 2") is performed. In this example, the read at 451 results in a BER above the target BER. Since the read at read voltage 451 corresponds to a BER above the target BER and the read at read voltage 453 corresponds to a BER below the target BER, the x-axis location (e.g., voltage) corresponding to the target BER 443 can be determined by interpolating between sample 1 and sample 2.

For the above example, the interpolation between sample 1 and sample 2 to determine the relative x-axis location corresponding to the target BER (e.g., "TargetBERx") can be demonstrated by the formula:

$$TargetBERx = Sample1 + [(TargetBER - Sample1BER)/(Sample2BER - TargetBER)]$$

where "Sample1" is the read voltage 453 used for sample 1, "Sample1BER" is the BER determined for the read using read voltage 453 and "Sample2BER" is the BER determined for the read using read voltage 451.

A similar method can be employed to determine the x-axis location corresponding to the target BER for Vt distribution 450-2. Therefore, the level width 455 can be determined based on the difference between adjacent edges of Vt distributions 450-1 and 450-2 at the target BER 443. As described herein, the level width such as level width 455 can be summed with other level widths corresponding to a group (e.g., page) of cells to constitute an overall level width. In various embodiments of the present disclosure, a determined (e.g., measured) BER corresponding to a particular memory cell programmed using the level width can be compared to a target BER, and programming signal characteristics such as step size and/or step duration can be adjusted in order to achieve the target BER.

Figure 5:
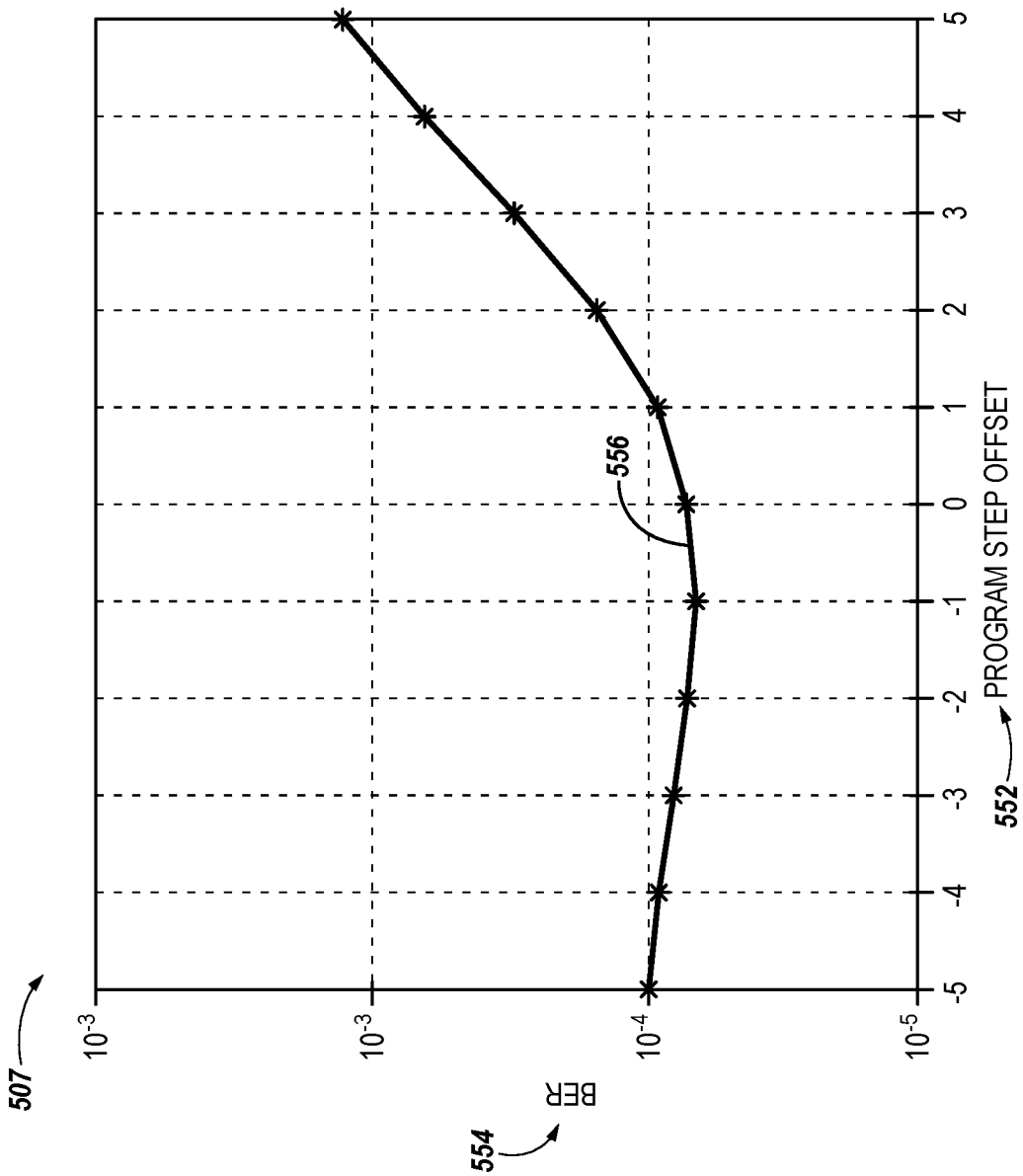
FIG. 5 illustrates at least a portion of a bit error rate among example threshold voltage distributions of a particular page of memory cells in accordance with some embodiments of the present disclosure.

FIG. 5 is a diagram 507 of an example bit error rate (BER) distribution corresponding to adjusting one or more program step characteristics for programming memory cells in accordance with some embodiments of the present disclosure. The diagram 507 illustrates a plurality of BER values 554, illustrated along the y-axis, during a number of program step offsets 552, illustrated along the x-axis. The BER value 556 illustrated corresponds to a change in BER value due to a particular program step offset performed (e.g., program step offsets −5 through 5, as illustrated). As a program step characteristic is adjusted, as described in association with FIGS. 1-4B, a BER of a corresponding page, number of pages, device system, etc. can be adjusted. For example, as the program step offset 552 is adjusted from a "0" to a "1," the BER 554 is adjusted (e.g., increased) to approximately $10^{-4}$.

As the program step offset 552 is adjusted upward (e.g., towards program step offset "5" in the diagram 507), the BER values increase. Likewise, as the program step offset 552 is adjusted downward (e.g., towards program step offset "−5" in the diagram 507), the BER values decrease to about program step offset −1, and then increase from program step offset −1 to −5. In this way, the program step offsets 552 can be adjusted in order to fine-tune the BER value to adjust a particular BER to a target BER.

Figure 6:
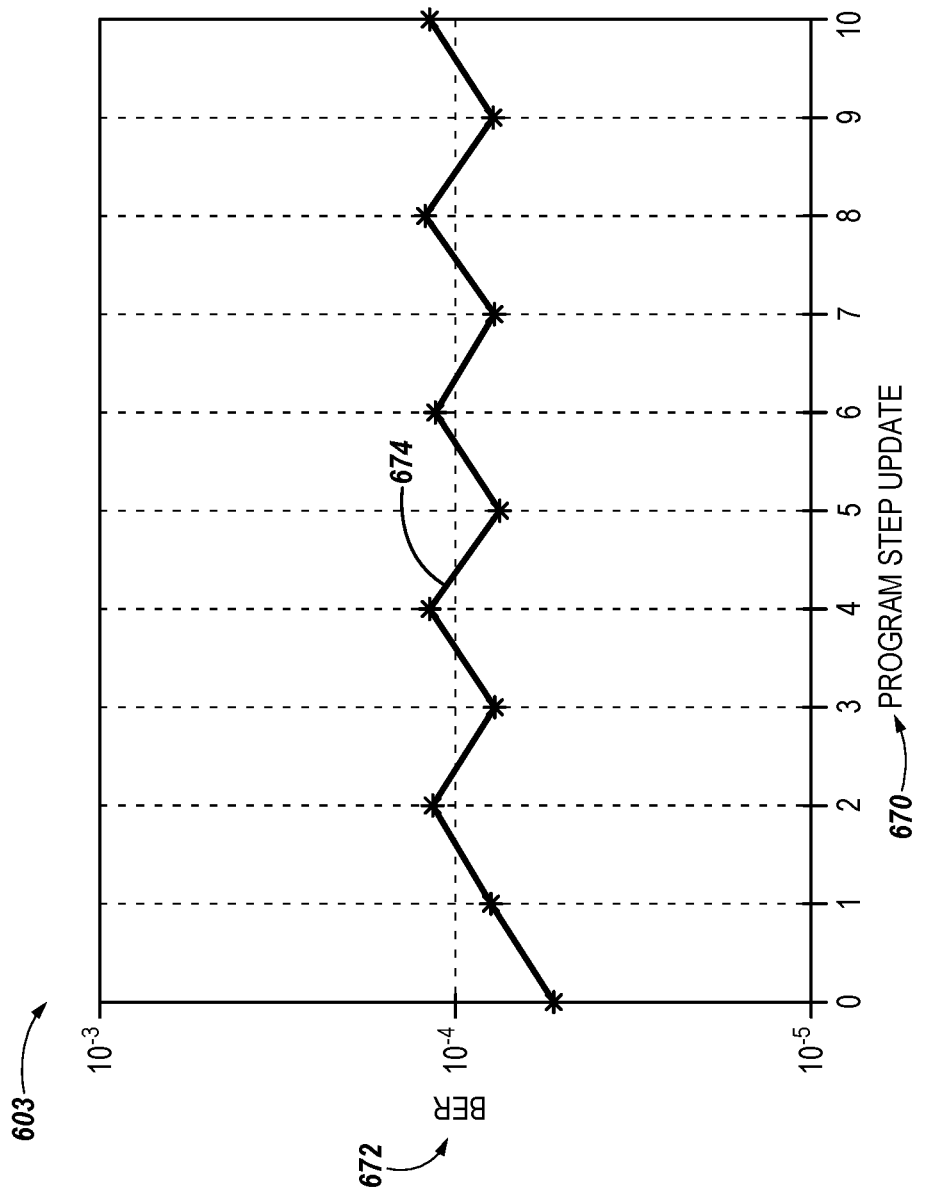
FIG. 6 is a diagram of an example bit error rate distribution corresponding to adjusting one or more program step characteristics for programming memory cells in accordance with some embodiments of the present disclosure.

FIG. 6 is a graph 603 illustrating how adjusting one or more program step characteristics affects the BER in accordance with some embodiments of the present disclosure. Curve 674 shown in graph 603 illustrates the changes to a BER 674 corresponding to a group of cells responsive to respective program step size adjustments 670 (e.g., program step size updates 0 through 10). As an example, the BER can correspond to a summation of respective BERs such as those described above in FIG. 3 and FIG. 5.

In operation, the program step size adjustments can be made responsive to determining that a measured BER is different than a target BER. For instance, in the example shown in FIG. 6, the BER is below $10^{-4}$ prior to any program step size update. Subsequent program step size updates can be made to move the BER toward the target BER, which may be about $10^{-4}$, in this example. If the measured BER is determined to be below the target BER, then the next subsequent update can involve adjusting the step size (e.g., increasing the step size) in order to increase the measured BER. Conversely, if the measured BER is determined to be below the target BER, then the next subsequent update can involve adjusting the step size (e.g., decreasing the step size) in order to decrease the measured BER toward the target BER. The amount of the step size adjustment associated with the respective updates can be based on a linear relationship such as that described in FIG. 5, for example. Determining an amount of step size adjustment to achieve a particular BER adjustment is described further below.

Figure 7:
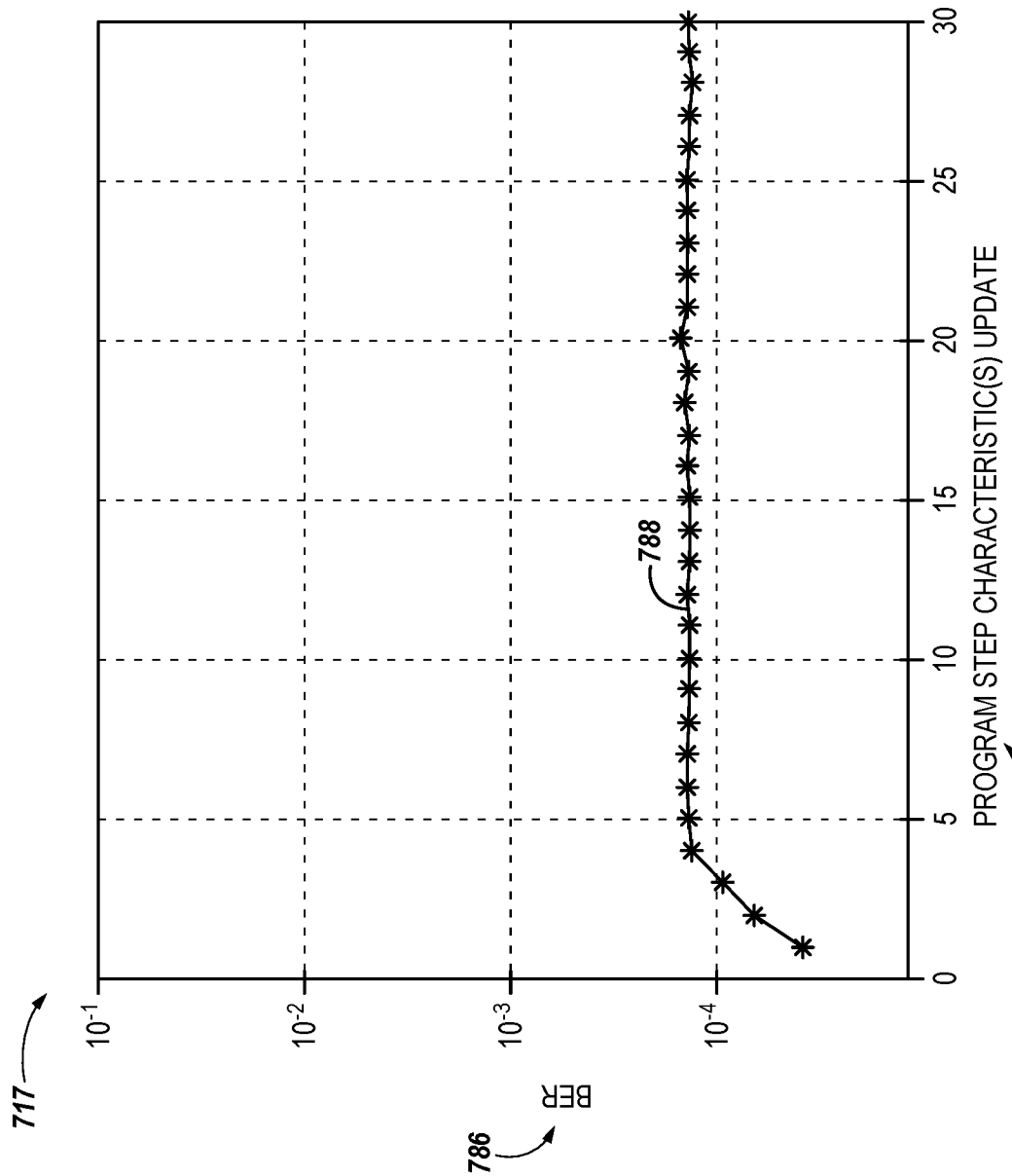
FIG. 7 is a diagram of an example bit error rate distribution corresponding to adjusting one or more program step characteristics for programming memory cells in accordance with some embodiments of the present disclosure.

FIG. 7 is a graph 717 of an example BER width distribution corresponding to adjusting one or more program step characteristics for programming memory cells in accordance with some embodiments of the present disclosure. The graph 717 illustrates a BER at corresponding program step characteristic(s) updates 782. A BER 788 refers to a summation of BERs across a number of pages of data. Each of the program step characteristic update(s) 782 can include adjusting a program step size, adjusting a program step duration, and/or adjusting a program step size and a program step duration concurrently, simultaneously, and/or in succession. In this way, each of the program step characteristic(s) updates 782 is adjusting the BER 788 toward a target BER, which in this example is approximately $10^{-4}$ In this way, one or more program step characteristic(s) can be adjusted to adjust a BER to a target BER. A prior adjustment of a BER toward a target BER can be used as a feedback loop in a subsequent adjustment of the BER until the BER is equal to or within a threshold proximity to the target BER.

Figure 8:
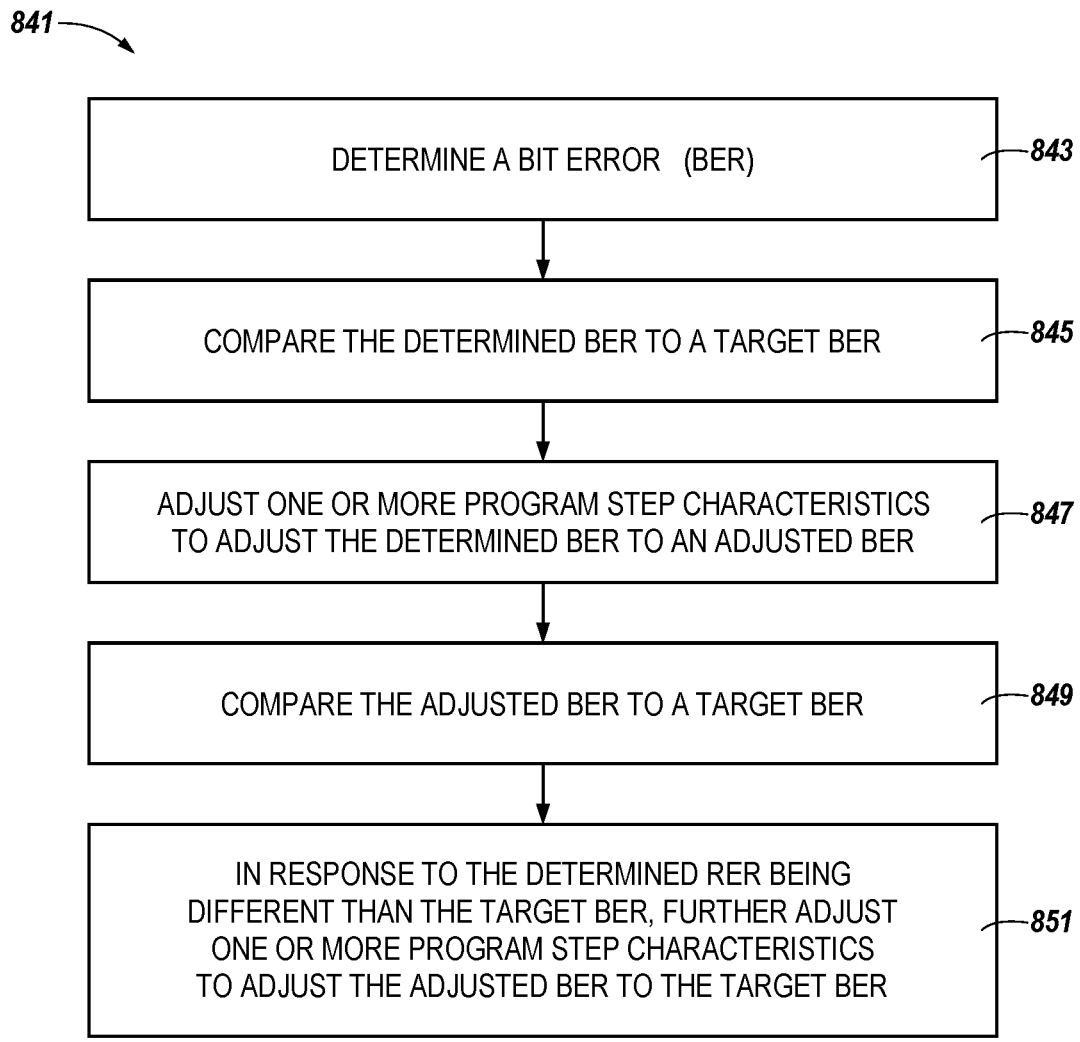
FIG. 8 is a flow diagram of an example method corresponding to adjusting one or more program step characteristics for adjusting a bit error rate in accordance with some embodiments of the present disclosure.

FIG. 8 is a flow diagram of an example method 841 corresponding to adjusting one or more program step characteristics (e.g., one or more of a program step size and a program step duration) for programming memory cells in accordance with some embodiments of the present disclosure. The method 841 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 841 is performed by the program step characteristic component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 843, the processing device determines a bit error rate (BER) based on a bit error count from a data scan. The bit error count can be used to generate a histogram. The histogram can be used to generate a plot to illustrate bit error counts, as is illustrated in FIG. 5. At block 845, the processing device compares the determined BER to a target BER. The determined BER can be determined to be less than or below the target BER, equal to the target BER, or greater than or above the target BER. At block 847, the processing device adjusts one or more program step characteristics to adjust the determined BER to an adjusted BER. In response to the determined BER being less than the target BER, the one or more program step characteristics can be adjusted, as described above, to increase the determined BER. In response to the determined BER being equal to the target BER, the one or more program step characteristics can be adjusted by zero or a value close to zero, as described above, to maintain the determined BER at the target BER. In response to the determined BER being greater than the target BER, the one or more program step characteristics can be adjusted, as described above, to decrease the determined BER.

In one embodiment, one or more of the program step characteristics can include a program step size and a program step duration. A relationship can exist between a program step size (e.g., program gate step size) and a BER value. A relationship can exist between a program step duration (e.g., a program pulse duration time) and the BER value. These relationships can be combined and used to correspond (e.g., in a linear or nonlinear relationship) to the change in BER with a particular resolution (e.g., a higher resolution). In this example, the change in BER ("DeltaBER") can be equal to a change in program step size ("DeltaProgramStep") plus a change in program step duration ("DeltaProgramTime"), as demonstrated by the formula:

DeltaBER=DeltaProgramStep+DeltaProgramTime where a known delta of a program step duration can be equivalent to one increment of a program step size. As an example, if one increment of a program step size results in a 5% change in BER and "n" number of increments of delta program step duration also results in a 5% change in BER, then changing the BER by 5% can be accomplished by either changing the program step size by one increment or changing the program step duration by n number of increments. To change the BER by only 2%, the program step size can remain the same and the program step duration delta could be adjusted by (2%/5%)*n. To change the BER by 13%, the program step size delta could be 2, resulting in 2*5%=10% plus a change in the program step duration of (3%/5%)*n.

In one example, the two relationships can be treated as linear relationships. In one example, the two relationships that affect programming time can be represented by a formula which can include dependencies and non-linear effects. In another example, the relationships can be represented as tables which are indexed in a linear fashion but output differing amounts based on their index. In this example where the delta program step size and the delta program step duration are used as a function, the combination of the two parameters can be computed for a given change in BER. As an example:

[Program Step,ProgramTime]=funcProgramStep_ProgramTime(BERdelta)

In the example where the delta program step size and the delta program step duration is used as a table lookup, the combination of the two parameters can be pre-computed for a given change in BER, such as in the following table:

TABLE 1

| Table Index | Program Step | Program Time | BERdelta % |
|---|---|---|---|
| 0 | −2 | 0 | −2.00 |
| 2 | −2 | 7 | −1.50 |
| 3 | −1 | 0 | −1.00 |
| 5 | −1 | 10 | −0.50 |
| 6 | 0 | 0 | 0.00 |
| 8 | 0 | 10 | 0.50 |
| 9 | 1 | 0 | 1.00 |
| 11 | 1 | 10 | 1.50 |
| 12 | 2 | 0 | 2.00 |
| 14 | 2 | 12 | 2.50 |

Note that the program step duration for the table index of 2 is 7 and the program step duration for the table index of 14 is 12, illustrating a non-linear relationship.

In relation to program step duration, in at least one example, program step duration can be measured by counting clock cycles of a known frequency between a time a program command was issued to a memory (e.g., a NAND) and when the memory programming operation is complete. In another example, the program step duration can be measured by using a number of program pulses used to complete the memory program operation and apply a known amount of time for each pulse. BER can be calculated by using multiple measurements of differing page types or differing programming operations and computing a metric (e.g., a value based on a generated logarithmic scale, as described above) that is used as a feedback for controlling a dynamic BER (DBER).

At block 849, the processing device compares the adjusted BER to the target BER. At block 851, in response to the determined BER being different than the target BER, the processing device further adjusts one or more program step characteristics to adjust the adjusted BER to the target BER. As an example, the initial attempt of adjustment of the BER from the determined BER to the target BER may have some errors and this second comparison could identify those errors and adjust again. In the alternative, parameters while operating the memory could create anomalies in the memory cells and an adjustment to realign the BER to the target BER may be performed. These anomalies can be created by wearing on the memory cells from many reads and/or writes to and from the cells. These anomalies can be created by temperature fluctuations that may damage and/or alter the memory cells. Whiles these examples are given, examples are not so limited. Any parameters that affect the memory cells and their ability to be programmed and/or used to perform memory operations could affect the BER and use additional adjustment. This repetition of adjustment can be performed in a dynamic feedback loop where each subsequently adjusted BER is compared to a previously adjusted BER in order to fine tune the working BER to be the same as the target BER.

Figure 9:
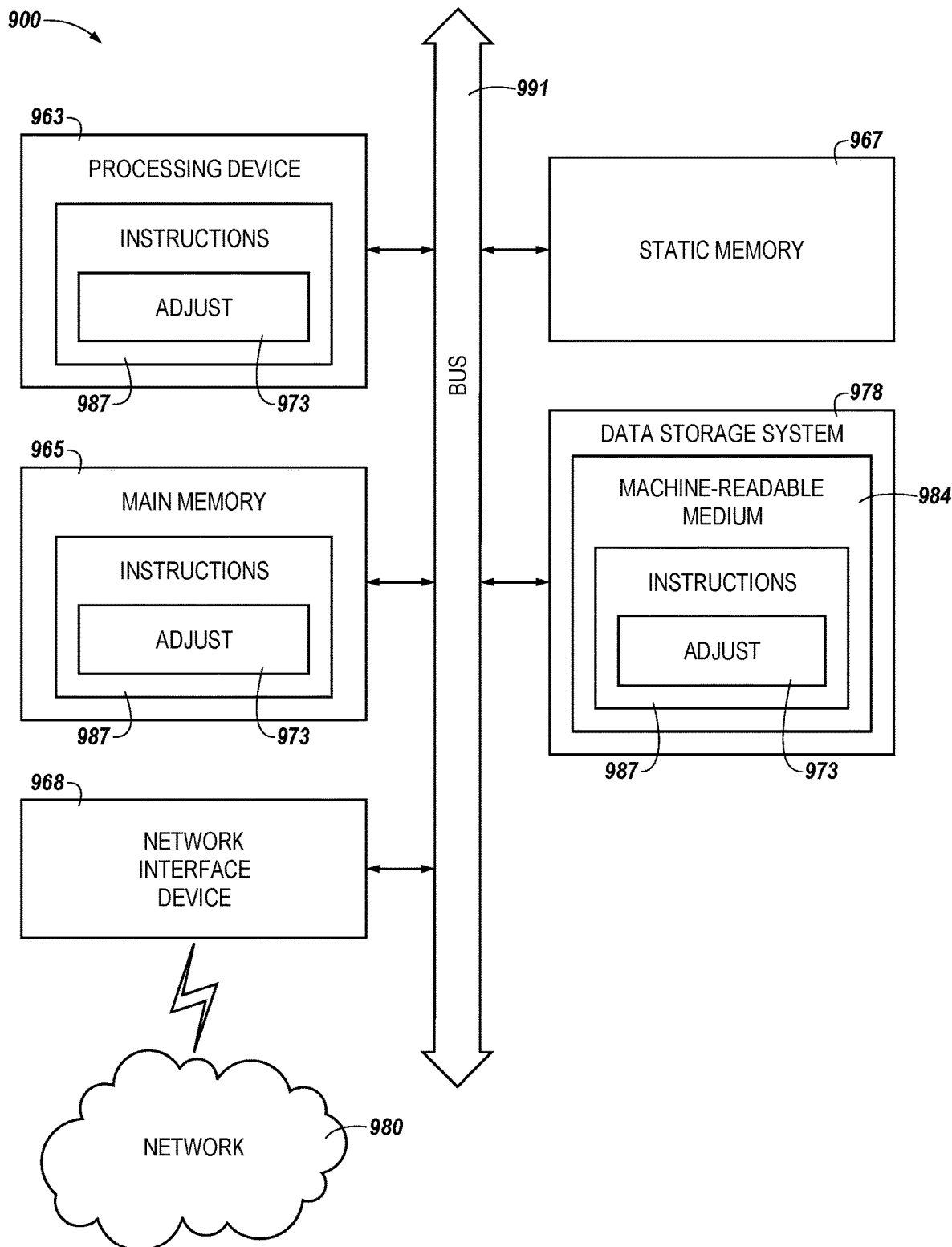
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 102 of FIG. 1) that includes, is coupled to, or utilizes a memory sub-system (e.g., the memory sub-system 104 of FIG. 1) or can be used to perform the operations of a controller (e.g., to adjust a parameter associated with programming a memory cell, such as program step characteristic component 113. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 963, a main memory 965 (e.g., read-only memory (ROM), flash memory, dynamic random access memory (DRAM) such as synchronous DRAM (SDRAM) or Rambus DRAM (RDRAM), etc.), a static memory 967 (e.g., flash memory, static random access memory (SRAM), etc.), and a data storage system 979, which communicate with each other via a bus 991.

Processing device 963 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 963 can also be one or more special-purpose processing devices such as an application specific integrated circuit (ASIC), a field programmable gate array (FPGA), a digital signal processor (DSP), network processor, or the like. The processing device 963 is configured to execute instructions 987 for performing the adjustment operations using an adjustment component 973 (including either or both of the program step size component and the program step duration component previously described) and steps discussed herein. The computer system 900 can further include a network interface device 968 to communicate over the network 980.

The data storage system 978 can include a machine-readable storage medium 984 (also known as a computer-readable medium) on which is stored one or more sets of instructions 987 or software embodying any one or more of the methodologies or functions described herein. The instructions 987 can also reside, completely or at least partially, within the main memory 965 and/or within the processing device 963 during execution thereof by the computer system 900, the main memory 965 and the processing device 963 also constituting machine-readable storage media. The machine-readable storage medium 984, data storage system 978, and/or main memory 965 can correspond to the memory sub-system 104 of FIG. 1.

In one embodiment, the instructions 987 include instructions to implement functionality corresponding to a program step characteristic component (e.g., program step characteristic component 113 of FIG. 1). While the machine-readable storage medium 984 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
    a memory component including a group of memory cells; and
    a processing device coupled to the memory component and configured to:
        in response to a determined bit error rate (BER) corresponding to the group of memory cells being different than a target BER, adjust one or more of a plurality of program step characteristics to adjust the determined BER toward the target BER by incrementing with a particular resolution,
        wherein the one or more program step characteristics are adjusted based on a relationship between at least two program step characteristics of the plurality of program step characteristics and the particular resolution correlates with the relationship.

2. The system of claim 1, wherein the relationship between the at least two program step characteristics comprises a relationship between a program step size and a program step duration.

3. The system of claim 1, wherein the one or more program step characteristics comprises at least one of a program step size or a program step duration of a programming signal applied to a group of memory cells.

4. The system of claim 3, wherein the processing device is further configured to adjust the program step size without adjusting the program step duration to adjust the determined BER toward the target BER.

5. The system of claim 3, wherein the processing device is further configured to adjust the program step duration without adjusting the program step size to adjust the determined BER toward the target BER.

6. The system of claim 1, wherein the group of memory cells comprises a plurality of pages of cells, and wherein the BER is determined for all pages of the cells.

7. The system of claim 6, wherein the BER is determined on a page by page basis for the plurality of pages.

8. A method, comprising:
    determining a bit error rate (BER) corresponding to a group of memory cells programmed via a programming signal having two or more of a plurality of program step characteristics;
    comparing the determined BER to a target BER; and
    in response to the determined BER being different than the target BER, adjusting one or more of the plurality of program step characteristics by incrementing with a particular resolution to reprogram the portion of cells to adjust the determined BER to an adjusted BER, wherein adjustment of the one or more program step characteristics is based on a relationship between at least two of the plurality of program step characteristics and the particular resolution correlates with the relationship.

9. The method of claim 8, further comprising comparing the adjusted BER to the target BER.

10. The method of claim 8, further comprising, in response to the adjusted BER being different than the target BER, further adjusting the one or more program step characteristics based on the relationship to reprogram the portion of cells to adjust the adjusted BER toward the target BER.

11. The method of claim 8, wherein the one or more program step characteristics adjusted comprises a program step size and a program step duration.

12. The method of claim 11, the method further comprising increasing at least one of the program step size and the program step duration by a respective particular amount based on the relationship in response to determining that the determined BER satisfies a threshold associated with the target BER.

13. The method of claim 11, wherein the method further comprises decreasing at least one of the program step size and the program step duration each by a respective particular amount based on the relationship in response to determining that the determined BER satisfies a threshold associated with the target BER.

14. The method of claim 8, further comprising repeating a comparison of a previously adjusted BER to the target BER.

15. The method of claim 8, wherein the BER is a sum of BERs among the plurality of threshold voltage distributions.

16. A system, comprising:
    a memory component including a plurality of memory cells; and
    a processing device coupled to the memory component and configured to:
        adjust one or more of a plurality of program step characteristics by a respective determined amount to adjust a previously determined BER toward a target BER with a particular resolution based on a relationship between at least two of the plurality of program step characteristics, wherein the particular resolution correlates with the relationship.

17. The system of claim 16, wherein the one or more program step characteristics adjusted comprises a program step size and a program step duration, and the respective determined amount is based on a determined relationship between the program step size and the program step duration.

18. The system of claim 16, wherein the processing device is further configured to repeatedly adjust the one or more program step characteristics adjusted based on the relationship to maintain a constant BER at a target BER.

19. The system of claim 16, wherein the processing device is further configured to adjust the one or more program step characteristics in response to a change in programming of the memory component.

20. The system of claim 19, wherein the change in programming comprises one of:
   a chance due to wear cycling of the memory component; or
   a temperature change in the memory component.

* * * * *